April 6, 1943.　　　C. A. H. MULDER　　　2,315,486
POWER TRANSMISSION SYSTEM
Filed July 13, 1938　　　6 Sheets-Sheet 1
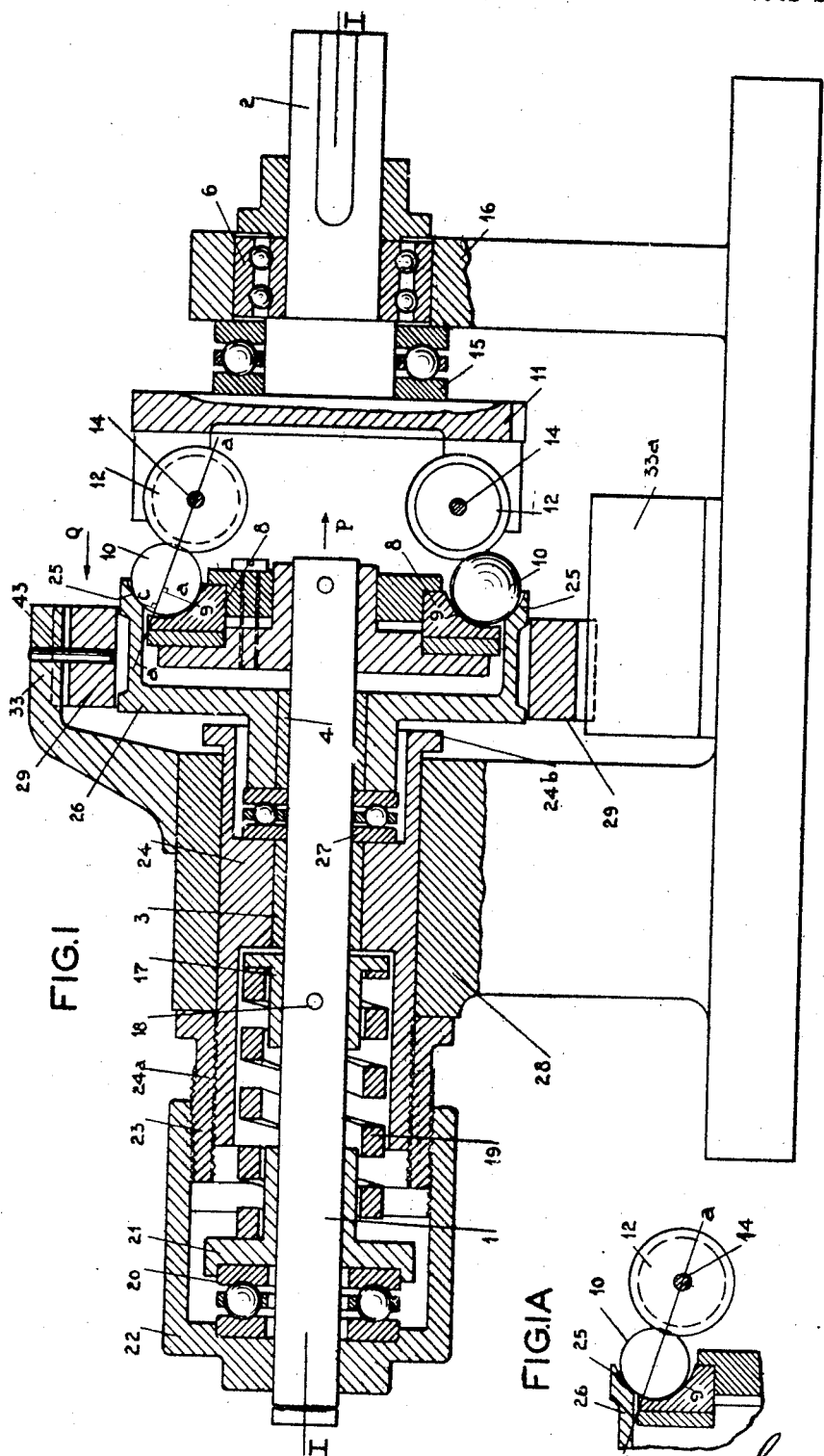
Inventor:
C. A. H. Mulder
By E. F. Wenderoth
Atty April 6, 1943.  C. A. H. MULDER  2,315,486
POWER TRANSMISSION SYSTEM
Filed July 13, 1938  6 Sheets-Sheet 2
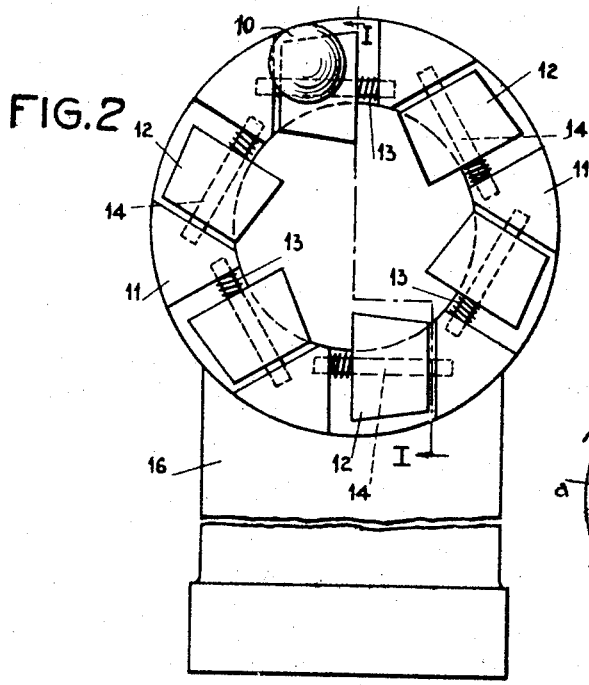
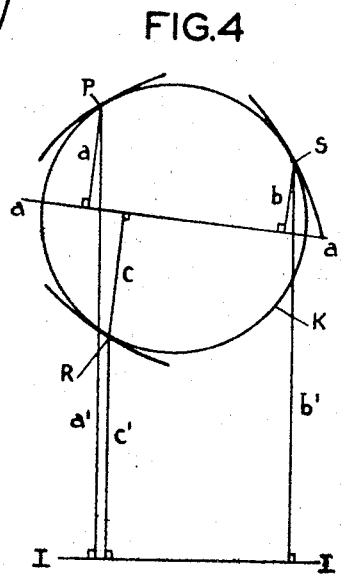
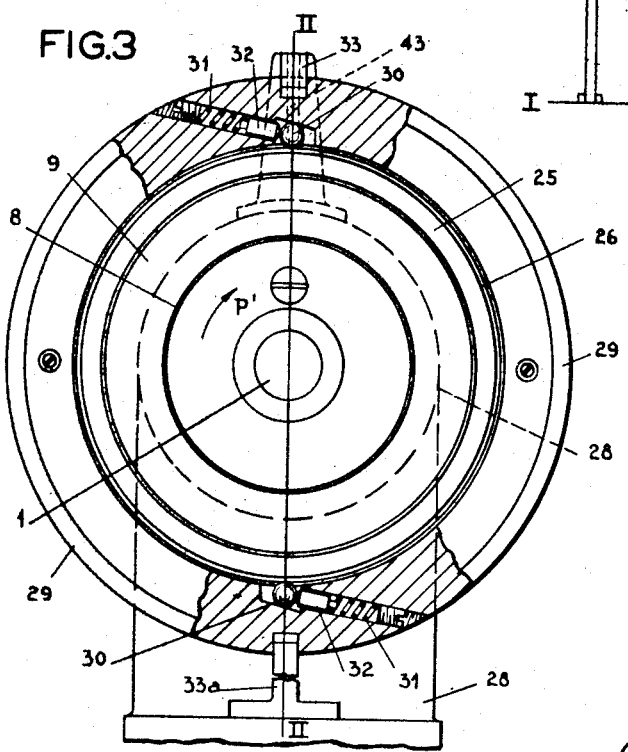
Inventor:
C. A. H. Mulder
By E. F. Wendroth
Atty April 6, 1943. C. A. H. MULDER 2,315,486
POWER TRANSMISSION SYSTEM
Filed July 13, 1938 6 Sheets-Sheet 3
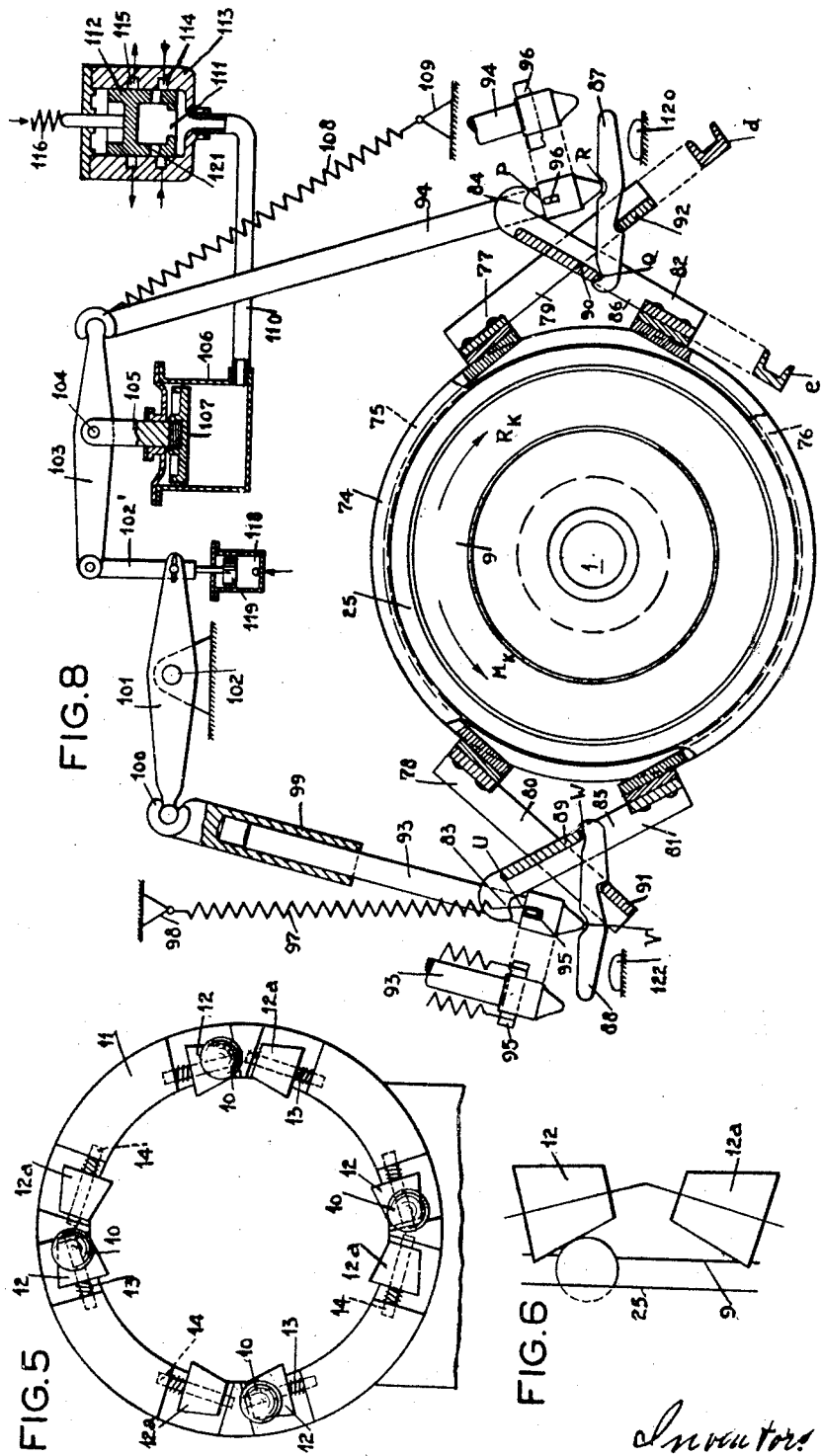

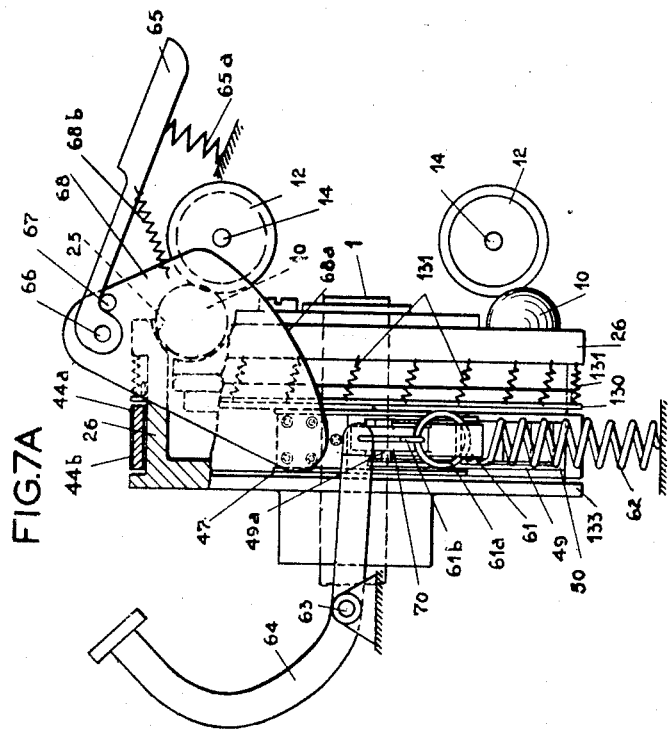
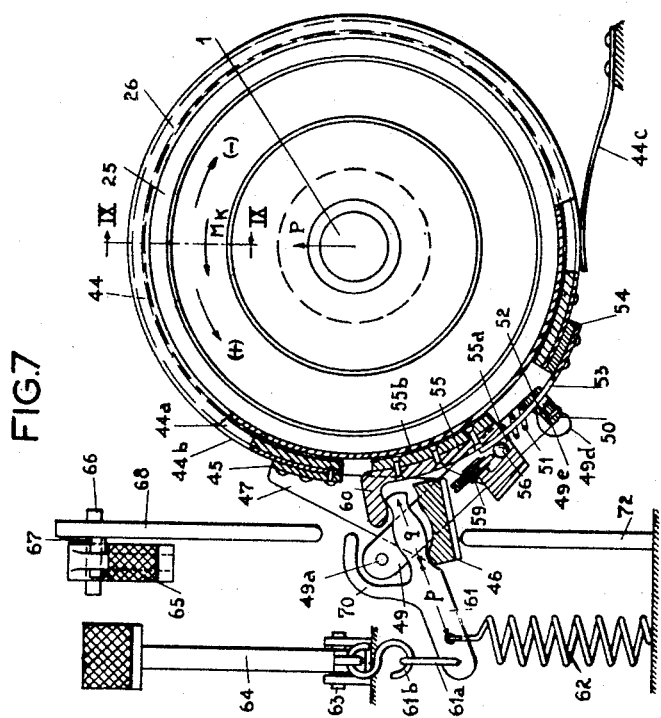

April 6, 1943.  C. A. H. MULDER  2,315,486
POWER TRANSMISSION SYSTEM
Filed July 13, 1938   6 Sheets-Sheet 5

Inventor:
C. A. H. Mulder
By E. F. Wendiroth
Atty

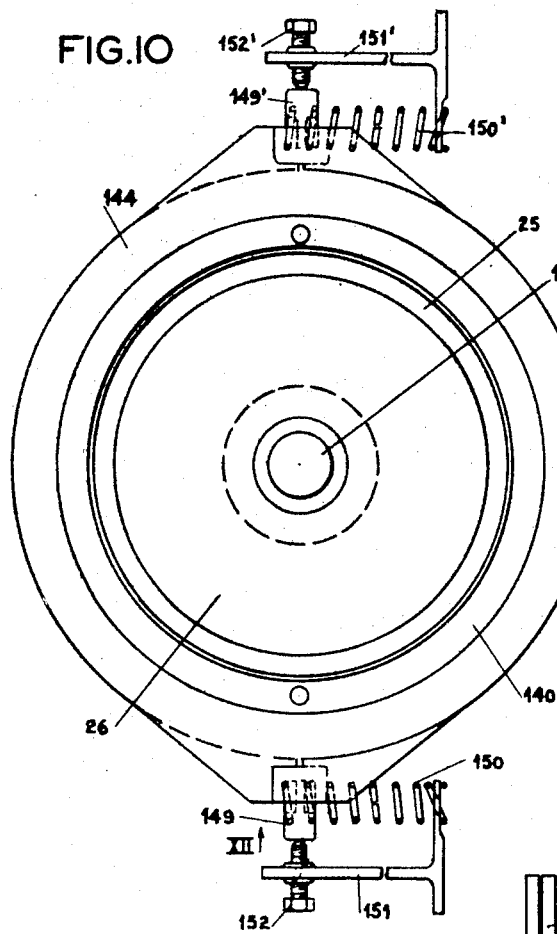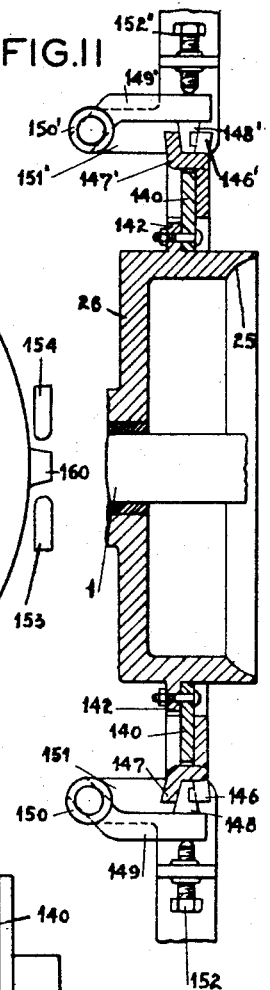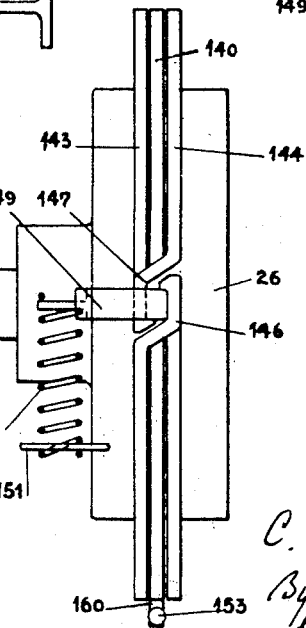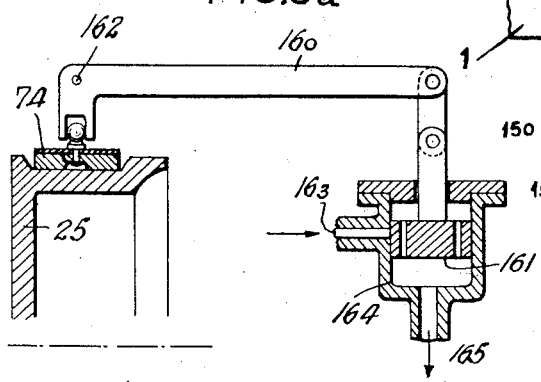

Patented Apr. 6, 1943

2,315,486

UNITED STATES PATENT OFFICE 2,315,486

POWER TRANSMISSION SYSTEM

Cornelis Andries Heero Mulder, Utrecht, Netherlands; vested in the Alien Property Custodian Application July 13, 1938, Serial No. 219,087
In the Netherlands July 19, 1937

48 Claims. (Cl. 74—281)

My invention relates to improvements in power transmission systems and particularly in variable speed transmissions of the rolling frictional contact type in which an infinite number of speed variations may be produced.

My invention is particularly adapted to be embodied in change speed mechanisms for use in automobiles. Some embodiments of the invention are adapted to replace the conventional gear shift transmission and clutch.

More specifically, the invention relates to improvements in variable speed transmissions such as described in my prior United States Patent 1,897,436 although my present invention in its broader aspect is not dependent on the particular features claimed therein. Such transmissions are of the type comprising a frame, a drive shaft and a driven shaft, a body on one of the shafts, contact means on the other shaft providing a contact surface, a reaction member for taking the torque reaction and a plurality of solids of revolution, each of which is permanently in contact with said body, said contact means and said reaction member, and in which said body, contact means and reaction member are adjustable relative to each other to vary the gear ratio. One of the objects of the invention is to prevent in such transmissions slippage of the planetizing solids in their contact points with the reaction member.

An important feature of my invention in this respect is that it provides in such transmissions means for rotating the reaction member about its axis at the 1:1 gear ratio.

Another object of the invention is to provide in such transmissions means for interchanging the functions of the drive shaft and the driven shaft so that when used in an automobile, the car can drive the engine and be braked by the engine.

Another object of the invention is a transmission system with automatically variable gear ratio and an automatic coupling or clutch.

According to one embodiment of the invention, the reaction member of the transmission may cooperate with a brake device which allows the reaction member to rotate freely at the 1:1 gear ratio and which at the other gear ratios transmits the torque reaction to the frame by coupling the reaction member to the frame.

In a motorcar this brake device may be used as a clutch, if necessary automatically, but it may also be used to brake the car and as a brake generally. The brake may be controlled by a servomotor, as for example, either electrically or by means of a pneumatic or hydraulic pressure and/or by means of a time relay, or of a pressure reducing device or by the primary, the secondary or the reaction couple (torque reaction).

In order to avoid excessively abrupt and excessively smooth operation, the brake may be constructed so that it slips at any load exceeding a predetermined value, this value being controlled for one or both directions of rotation of the reaction member by a servomotor; for example, according to a certain time function and/or the tension of an elastic medium or member and/or the adjustment of a stop, and/or the load and/or the number of revolutions at which the driving or the driven shaft of the transmission is driven.

The maximum torque reaction to be transmitted according to the invention may also be governed by the position of a member which governs the power to be transmitted by the transmission, or which depends thereon.

For instance, in a motorcar, the position of the gas lever, the degree of vacuum in the suction line or the value of the reaction couple which the engine (which may be resiliently suspended) exerts on the frame, etc. may serve as a criterion for the maximum load which the brake can transmit. This enables inertia impact and racing of the engine to be avoided, and allows the engine to be driven at a constant speed, which is most appropriate to the road conditions, the weight of the car and the desired acceleration.

In this manner, according to the invention, an automatic clutch can be obtained which from a theoretical as well as from a practical point of view is much better than the pneumatically, hydraulically, electrically or mechanically controlled devices known to-day, in which sometimes a rather complicated device is used to make the operation dependent on the gear ratio which happens to be in use. According to my invention, the maximum value of the torque reaction being regulated, the effective instantaneous torque is rendered dependent on the gear ratio in a very simple and useful manner.

Further new features of the invention will be hereinafter described and pointed out in the claims.

In the drawings:

Fig. 1 is a longitudinal section of a transmission in which the invention is applied to a construction according to United States specification 1,897,436.

Fig. 1a is a detail view illustrating the position of a solid of revolution when the gear ratio is 1:1;

Fig. 2 is an elevation viewed in the direction of the arrow P in Fig. 1 of said figure;

Fig. 3 represents a constructional form of a free wheel coupling which can cooperate with the reaction member;

Fig. 4 is a schematic view illustrating the cooperation of the planetizing solids with the surfaces in certain embodiments;

Fig. 5 illustrates the possibility of reversing the direction in which the solids are driven; (braking by means of the motor);

Fig. 6 is a schematic view showing how a solid is arranged with respect to the surfaces according to Fig. 5;

Fig. 7 is an elevation of another embodiment of a coupling which, in definite circumstances, may freewheel in one or in both directions of rotation of the gear;

Fig. 7a is a side elevation of Fig. 7;

Fig. 8 is an elevation of a third embodiment of a freewheel coupling, which under certain circumstances may freewheel in one or both directions;

Figure 8a is a fragmentary view, partly in section and partly in elevation, of a detail of the construction of Figure 8.

Fig. 10 is a front view of a self exciting coupling such for example as a brake device, in which disc-shaped friction elements are used;

Fig. 11 is a partial plan view of a device according to Fig. 10;

Fig. 12 is a partial side view of the device according to Fig. 10.

Figure 7B:
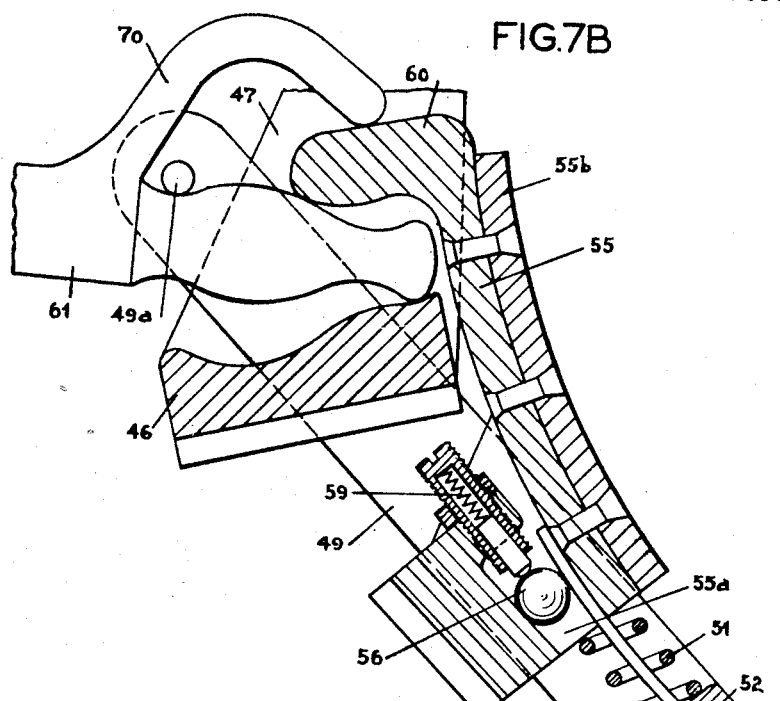
Fig. 7b is a detail view of a part of Fig. 7.

In Figure 1, the driving (primary) shaft is indicated at 1 and the driven (secondary) shaft at 2. The shaft 1 is journalled in bushings 3, 4.

The shaft 2 is journalled in ball bearing 6. At the end of the shaft 1, a body 8 is connected to the shaft the surface 9 (a surface of revolution) of which body cooperates with the balls 10. At one end of the driven shaft 2, there is a carrier 11. In the recesses of this carrier conical rollers 12 are mounted (see also Fig. 2). The view of the rollers 12 in Fig. 1 is taken on the line I—I in Fig. 2. These rollers 12 may be shifted on shafts 14 against the action of springs 13 (see Fig. 2), said shafts 14 being fixed in the carrier 11.

Furthermore, the balls 10 contact with a race 25 forming part of a member 26. The latter parts will be herein referred to respectively as the reaction race and the reaction member, because under certain circumstances they can take the torque reaction. This will be described in detail later on.

It is of importance to note that each ball in any position of the transmission, including that when the gear ratio is 1:1, remains in contact with the surfaces 9, 12 and 25.

The shafts 14 of the rollers 12 are mounted at an angle with the main axis I—I of the transmission, so that a wedge-shaped or tapered three-dimensional space is defined between the race 25, the surface 9 and the surface of the conical rollers 12, with the apex pointed generally in the desired direction of rotation. In that wedge shaped space the balls 10 are disposed and the apex angle of the conical rollers 12 is so chosen with respect to the other surfaces 9 and 25 that each ball 10 may be clamped between the surfaces 9, 12 and 25 and yet rotate about an axis passing through the center of the ball and through the axis I—I of the device. Such action has also been described in the prior U. S. Patent 1,897,436 of the same inventor.

In the direct drive position (gear ratio 1:1) (see Fig. 1a) each solid 10 is clamped between a roller 12 and the primary surface 9, and the axis of rotation of the solid then passes approximately through the point of contact with the surface 9, the center of the solid and the point at which the axis of the roller 12 intersects the plane of the drawing. The significance of this will be pointed out hereinafter.

Also, in this position, the solid 10 remains in contact with the contact surface 25 of the reaction member 26, which for this purpose is suitably positioned by bushing 24 and screw threads 24a, which will be described further on.

In the arrangement of Figure 1, the operation of the balls 10 is as follows:

If the shaft 1 rotates say in a clockwise direction as viewed from the left of the figure, and assuming that the reaction member 26 and therefore the race 25 are for the time being held against rotation and that the secondary shaft 2 is at rest, each ball is driven by the surface 9 towards the narrow part or apex of said wedge-shaped space and starts rotating about an axis $a$—$a$ which approximately passes through the centre of the ball and through the axis I—I of the transmission. During this movement of the balls 10, the surface 9 may be urged bodily backward by reaction to the left in Fig. 1 against the action of a spring 19, so that the balls can vary their position with respect to the rollers 12 and be more or less firmly clamped. The clamping pressure depends on the torque to be exerted on the driven shaft 2 (the load on the transmission). The balls roll on the member 26 and react thereon. Said member 26, being immobilized, takes the torque reaction. Furthermore, the balls drive the rollers 12 forward, likewise in a clockwise direction, together with the carrier 11 and the driven shaft 2.

The gear ratio depends upon the distances $a$ and $c$, from the points of contact of the balls with the surfaces 9 and 25 respectively, to the axis of rotation $a$—$a$ of the said balls. These distances vary with the respective positions of the balls 10 in the said wedge-shaped space. If the distance $a$ is about zero, the balls are only clamped between the surface 9 and the rollers 12, and this is the position of direct drive between the shafts 1 and 2, i. e. that in which the gear ratio is 1:1.

For the general aspects of the invention it is worthwhile to examine the forces exerted on the balls 10. The whole set of balls 10 may be considered as a body which rotates about the axis I—I of the apparatus. Primarily, this body of balls 10 is loaded by the forces acting at the contact points between the balls 10 and the surface 9 which is fixed to the drive shaft 1. These forces constitute a driving couple K. Furthermore, the balls 10 are loaded by the reaction forces exerted by the rollers 12. The balls 10 themselves exert forces on these rollers, which of course equal said reaction forces. The latter forces constitute a couple $K^1$ acting on the balls 10 oppositely to the couple K, and if the gear ratio be $n$, i. e. the number of revolutions of the driven shaft be $1/n$ times the number of revolutions of the primary drive shaft, then $K^1 = -n.K$. If the efficiency $e$ of the transmission is taken into account, $K^1$ equals $-e.nK$. The minus sign is used in order to indicate that the direction of $K^1$ is opposite to that of $K$. Now the set of balls acted upon by these couples $K$ and $K^1$ is only in equilibrium. When a reaction couple (torque reaction $R_k$) balances the difference between the couples $K^1$ and $K$.

For equilibrium of the set of balls, the sum of the couples acting on them should be zero. Hence $R_k + K^1 + K = 0$ or substituting $$K^1 = en.K, R_k = (en-1)K.$$

This proves that $R_k$ may be positive or negative. It becomes negative as soon as $en \leqq 1$ or $n \leqq 1/e$.

My present invention takes advantage of this phenomenon of the reversal of the direction of the torque reaction $R_k$. As soon as the torque reaction, which when the gear ratio $n$ is lower than 1:1 (driven shaft running slower than driving shaft) acts oppositely to the driving couple, changes its direction i. e. when $n=1/e$ the reaction member is so designed that it is no longer held against rotation, but can rotate freely together with the balls 10, so that no slip occurs at any time between said balls and said reaction member.

The axial pressure exerted during this clamping action on the rollers 12 by the balls 10 is taken by an axial thrust bearing 15, which bears against a frame 16, in which the ball bearing 6 is mounted.

If two sets of conical rollers 12 and 12a are provided as shown in Figs. 5 and 6 i. e. having their apices directed towards each other, two of the wedge-shaped spaces are formed, and the balls may be clamped in each of them and in opposite directions. When driving in one of these directions, braking by means of the motor may take place or, in more general terms, the secondary shaft may exert a driving action on the primary shaft.

A flanged bushing 17 is moreover connected to the primary shaft by means of a pin 18. A strong spring 19 presses against the flange of this bushing and, through a flanged bush 21, against an axial thrust bearing 20.

This bearing 30 bears against an adjustable bushing 22 which is screwthreaded to make it adjustable with respect to a bushing 23.

By means of the spring 19 the body 8 is permanently pressed against the balls 10. The force of the spring 19 may be adjusted by adjusting the bushing 22.

The reaction member 26 bears against the axial thrust bearing 21, which in turn bears against the bushing 24. By adjusting the bushing 24 with respect to the bushing 23 by means of a fine screw thread 24a, the reaction member is positioned with respect to the carrier 11 which carries the rollers 12. By these means, the transmission may be carefully adjusted before operation. The bushing 24 may be displaced axially in the frame 28. The bushing is rotatable by means of the part 24b which may be hexagonal. The reaction member 26 cooperates with a non-rotatable body 29.

Fig. 3 shows the construction and the manner of supporting this body in greater detail. This figure is a view of the body 29 taken in the direction of the arrow Q in Fig. 1.

The balls 10, which are situated in front of the plane of the drawing, are not shown in Fig. 3.

By means of the freewheel construction shown in Fig. 3, the reaction member 26 is freely rotatable in the direction in which the balls 10 are driven by the primary shaft.

The freewheel device shown in Fig. 3 comprises two clamping rollers 30, which are under the influence of spring urged pressure members 32. The springs are shown at 31. The rollers cooperate with surfaces of the reaction member 26 and the body 29 which converge so that rotation of the reaction member 26 in the direction of the arrow $P^1$ is rendered impossible owing to the wedging action of the rollers 30.

Now, this direction is the direction in which the torque reaction works, on the assumption made above that the shaft 1 seen from the left of Fig. 1 is rotated in a clockwise direction. Consequently, the member 26 can take the torque reaction. However, during direct drive (gear ratio 1:1) the reaction on the member 26 is zero and this member can be rotated in the direction in which the balls 10 planetize about the axis I—I of the transmission, so that no slip occurs between the balls 10 and the member 26, which is one of the main objects of the present invention.

The member 26 should not be loaded eccentrically by the clamping forces exerted by the rollers 30, because then the member takes up an assymmetrical position with respect to the balls 10 and the other surfaces cooperating therewith, so that one or more of the balls becomes more tightly clamped than the others and is obliged to take too great a part of the load to be transmitted. In order to prevent this, the body 29 is so fixed to the frame parts 33 and 33a that it can adjust itself automatically according to the line II—II in Fig. 3. Thus the load is equally distributed over the rollers 30. Axial movement of the body 29 is prevented by means of a pin 43 passing through the frame part 33 and the body 29.

Although in Fig. 1 a construction has been shown which works on the principle described in U. S. specification 1,897,436, that is to say, in which the balls are clamped in a wedge-shaped space, it is to be noted that such a wedging action of the balls is not essential in accordance with the invention.

Fig. 4 shows in principle that a 1:1 gear ratio may also be obtained in another manner than that according to the U. S. specification 1,897,436, that is, when no wedge-shaped spaces are formed between the surfaces contacting with the solids.

If in this Figure 4, P be a point in the primary surface, S a point in the secondary surface (connected to the driven shaft) and R a point in the reaction surface, $a$ and $b$ distances from the contact points P and S of the planet K to the axis of rotation $a$—$a$ of this body, $a'$ and $b'$ the distances from these points to the common axis I—I of the surfaces P and S, then it proves to be true that if $a:b = a':b'$, the number of revolutions of the secondary surface will be equal to those of the primary surface and hence the gear ratio is 1:1.

The proof is as follows:

If the number of revolutions of the primary surface be $n$, then the linear velocity of the point P is $n.a^1$ and the number of revolutions of the ball about its axis is

If the number of revolutions of the secondary surface be $n^1$, then the linear velocity of point S is $n^1.b^1$ and the number of revolutions of the ball about its axis is $$\frac{n^1 b^1}{b}$$

Hence:

$$\frac{n^1.b^1}{b} = \frac{n.a^1}{a}$$

and if now $$\frac{a}{b} = \frac{a^1}{b^1}$$

it follows from this equation that $$\frac{n^1}{n} = \frac{1}{1}$$

It is to be noted that in Fig. 4 the various parts are not set so as to give a gear ratio of 1:1.

Figs. 7 and 7a show a free wheel coupling which enables the reaction memebr 26 to rotate freely in one direction and to start slipping in the other direction when the couple exceeds a certain predetermined and adjustable limit (a maximum value), and in which the coupling direction and the free wheeling direction may be interchanged.

This embodiment is particularly suitable for automobiles. The free rotation of the reaction member 26 (see also Fig. 1) in the direction marked + (which will henceforward be called positive rotation), which is the same as that of the driven shaft, is desirable in order to enable the gear ratio 1:1 of the transmission system according to the invention to be obtained. On the other hand, free rotation of the reaction member 26 in the opposite direction (negative direction) indicated by a minus mark enables the engine to run when the car is at rest and enables the car to be gradually started, without necessitating the use for this purpose of any other coupling. Furthermore, the free rotation of the reaction member in the positive direction may be used to enable the car to "free wheel," while by gradually braking this rotation the engine can be used as a brake.

According to the invention, the negative reaction couple i. e. the couple by means of which the negative rotation of the reaction member is braked, may be adjusted between zero and a certain maximum value for example by means of a pedal 65 (see Figures 7 and 7a). By this automatic adjustment of the transmission, of which the reaction member forms a part, a smooth drive is always obtained which is desirable for preventing shocks and an excessively high engine speed. It also enables the car driver to accelerate the car at will gradually or suddenly, to drive at uniform speed, to free wheel or to brake by means of the engine simply by controlling the gas pedal in a natural manner and, as far as braking by means of the motor is concerned, by pressing a special pedal 64, the multiple but yet simple function of which will be explained hereinafter.

In Fig. 7 the device is shown in a position in which the band brake, comprising strips of friction material 55b and 44a and steel parts 60, 53, 54 and 44b and 45, 47, 46, can be operated by the lever 61 to transmit a braking force to a spring 62 connected at one end to the frame and at the other end to the lever 61 and thus resist a negative reaction couple (see minus arrow) which is exerted by the transmission on the reaction member 26. The distances p and q between the lines of contact of the lever 61 and the members 60 and 46 which are connected to the ends of the brake band respectively and the connecting point of the spring 62 to the lever 61 are so chosen that the brake according to principles known to any expert in brakes, operates in so self-energizing a manner that it can brake any value of the reaction couple.

According to the invention however this self clutching operation in which the brake couple steadily increases is limited. The spring 62 is stretched according to the brake force taken until the hook shaped part 70 of the lever 61 abuts against the sector 68 which functions as a stop for this hook. The position of this sector 68 is determined by the gas pedal 65 pivoted at 66 to a fixed point of the frame. As soon as this abutting action takes place, the brake cannot energize itself any further, so that a slight further increase in the reaction couple is sufficient to cause slippage of the brake, while the brake continues to exert the braking action determined by the spring tension.

This tension, and hence the braking effect, will be greater when the pedal 65 is further lowered, because the sector 68 has an abutting surface 68a which is so curved that the spring 62 must be accordingly further elongated before the hook 70 abuts against the surface 68a. The shape of the surface 68a is so chosen that the pressure exerted on it by the hook 70 due to the friction cannot cause yielding of the sector. The spring connection 68b and the stop 67 between the sector and the pedal 65 (Fig. 7a) enable the pedal to rise easily, even when the return movement of the sector is temporarily resisted by the hook 70. The shape of the surface 68a may be so chosen that the hook 70 abuts against the sector 68, before the spring 62 is elongated, when the pedal 65 (the gas pedal) is in its highest position. The brake band will then not be able to take a substantial couple, so that the motor can run while the car is at rest and without exerting much power. Furthermore, the sector may be suitably shaped so that during starting, the brake functions efficiently as an automatic coupling.

In a certain position of the sector 68a, the braking effect exerted may be decreased by lowering a pedal 64 connected by means of a hook 61b and a link 61a to the lever 61, while the force thus exerted on the spring 62 causes the braking effect, which is reduced accordingly, to enable the hook 70 to abut against the sector 68. The pedal 64 pivots at 63.

The car driver may use this effect for example if he wants to speed up the engine even when the car is at rest, in order to increase the temperature of the engine to a suitable value.

In case of an actual motor car the pedal 64 as well as the pedal 65 are arranged at a suitable place within the reach of the driver's feet.

If in passing from the gear ratio 1:1 the reaction member 26 starts rotating in the positive direction, the band brake is taken along with the reaction member 26 in the direction of the plus arrow, until the part 46 abuts against the stop 72. The strength of the spring 62 is so chosen that it is then just unloaded, provided that the lever 61 is in the horizontal position. The band brake 44 will tend to loosen as much as possible under influence of its own internal stress. Consequently, the member 46 and the hook 60 fixed to the ends of the brake band will approach each other as far as possible and bring the lever 61 into this horizontal position. The weight of the band brake is now taken by the leaf spring 44c, and the drum 26 will rotate in the positive direction without any braking action and without wear and tear. If the transmission according to the invention is so constructed that it passes automatically from the gear ratio 1:1 to a smaller gear ratio when the driving couple exceeds a certain limit, then, as explained above, the brake drum (reaction member) 26 will gradually come to a standstill and subsequently start rotating in the negative direction unless this is prevented. In order to ensure that the band brake will enter into operation automatically as soon as the brake drum 26 tends to rotate in the negative direction, the ring 130 is slidably mounted on the drum 26 (see also Figs. 9 and 9b) and is connected to the drum 26 by means of helical springs 131, which as shown in the figures, are arranged at an angle with the main axis of the transmission.

Figure 9:
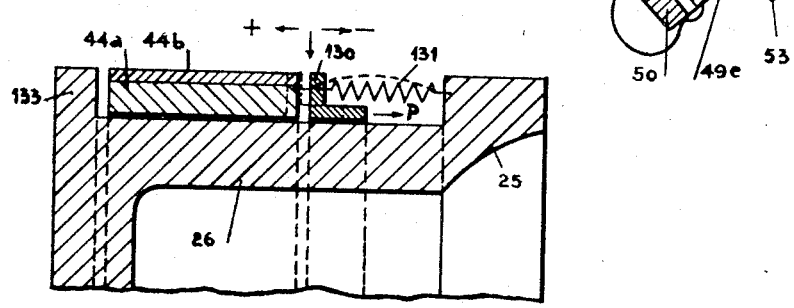
Fig. 9 is a section on a somewhat larger scale taken on the line IX—IX in Fig. 7

When the drum 26 rotates quickly, they will be somewhat bent outwards due to the centrifugal force, such that their axes are bent as shown dotted in Fig. 9. They will pull the ring 130 to the right (see arrow P in Fig. 9) so that the band 44 gets some backlash between the ring 130 and the flange 133. If the brake drum 26 gradually comes to a standstill, the springs 131 however will straighten themselves gradually and move the ring 130 somewhat to the left in Fig. 9, so that the brake band 44 is finally enclosed in an increasing manner between the ring 130 and the flange 133. As long as the brake drum rotates in the positive direction the members 130 and 133 will only be able to exert small forces on the band 44, because the ring 130, due to friction exerted on it by the band 44, may be slightly displaced with respect to the drum 26 in the direction of the minus arrow in Fig. 9, so that due to the angular position of the springs 131 with respect to the main axis of the transmission, disengagement is caused.

As soon however as the drum 26 has come to a standstill and tends to start rotating in the negative direction, the ring 130 will be shifted in the direction of the plus arrow in Fig. 9. Now the said angular position of the springs 131 causes an increasing pressure of the ring 130 against the brake band 44, which is also urged against the flange 133. Consequently the band brake is taken along a little with the drum 26 in the direction of the minus arrow in Fig. 7, so that it comes again into a position as shown in this figure in which the above described self-energizing takes place.

If the transmission according to the invention is so constructed for example as schematically shown in Figs. 5 and 6 that the transmission can pass from the 1:1 gear ratio to a smaller gear ratio, and also when the motor exerts a negative couple, (braking by means of the engine) then, in this operation, the reaction member 26 will start rotating faster and the primary shaft 1 will rotate slower then the shaft 2, unless the rotation of the reaction member 26 is braked in the direction of the plus arrow. If this does not happen, it may be said that the car free wheels, because the motor shaft rotates slower than the shaft 2.

For braking by means of the engine and even for speeding the engine up to above the speed of the driven shaft 2 hence for obtaining the braking effect, for which purpose a car driver in a car with a non-automatic change speed gear must change down to a lower speed, the driver using a transmission according to the invention needs only to lower the pedal 64. The force thus exerted and the force exerted by the spring 62, which is now stretched, act on the lever 61, and this lever comes into the position indicated in Figure 7b. The upwardly directed force exerted by the lever 61 on the stud 49a is transmitted by the side members 49 to which the stud 49a is fixed, to the connecting member 50 and subsequently to the steel band 53, which by means of the roller 52 (urged down by means of a leaf spring 49d), is clamped in the wedged-shaped aperture 49a in the part 50 (Fig. 7b). On the other hand, the brake band 44 is pulled down by the force which the lever 61 exerts on the hook 46.

In this position of the apparatus the member 60 is kept away from the part 50 by means of the compression spring 51, while the roller 56 in the wedge shaped space of the part 60 is kept permanently in contact with the steel band 53 by means of the spring 59 and jams it so that the spring 51 cannot unload itself. As wear and tear of the friction material 44a and the drum 26 increase, the lever 61, when contracting the brake band, will assume a more sloping position, so that finally the hook 60 is pressed down with respect to the stud 49a by the hook 70. The lever 61 rotates relatively about the stud 49a. As this relative movement occurs the part 60 slides downwardly along the steel band 53, so that the spring 51 is more compressed. If subsequently the brake has again to take a negative couple and the lever 61 operates as shown in Fig. 7, the spring 51 comes into a position in which it can distend by shifting the part 49, 50 downward along the steel band 53. In the above described adjustments, the operative part of the brake band 53, 44 is automatically shortened to an extent necessary for compensating the wear and tear of the material 44a and the brake drum 26.

In the construction according to Figure 8, coupling or braking means are also provided which if the gear ratio is 1:1 or if the engine coupled with the driving shaft 1 in Fig. 1 is running without driving the secondary shaft 2, are declutched, so that the reaction member 26 can rotate freely together with the planetary solids.

The means shown in Fig. 8 may be substituted in the device according to Figs. 1 and 2 for the means shown in Figs. 3 or 7. In that case, the reaction race 25 (Fig. 1) would be connected with the drum 74, which is used instead of the reaction member 26 in Fig. 1 and which is surrounded by a brake band comprising two diametrically opposed parts 75 and 76. At both ends of the part 75 pieces 77 and 78 of U-section are fixed, if desired, in an adjustable manner. The cross section of the piece 77 is indicated at d. This U-section is chosen because of its strength. Apertures 79 and 80 are formed in the parts 77 and 78 through which extend parts 81 and 82 of U-section which are connected to the ends of the band 76 (adjustably if desired) and which at their free ends, are provided with hooks 83 and 84. The cross section of the member 82 is shown at e. The members 81 and 82 are also provided with apertures 85 and 86 in which extend the ends of levers 88 and 87 which cooperate with edges 89 and 90 on the members 81 and 82 and with edges 91 and 92 on the members 78 and 77. The rounded conical ends of rods 93 and 94 are supported on the levers 88 and 87. In those ends, wedges 95 and 96 are provided which may cooperate with the hooks 83 and 84. Springs 97 engage the ends of the wedge 95 and are connected to a fixed support, for example, a fixed point in the frame of a motor car 98. The rod 93 can slide in the sleeve 99, which by means of a hook 100 engages a balance lever 101, which is rotatable about the fixed shaft 102. The other end of the lever 101 by means of the rod 102' is pivoted to a second balance lever 103, which is rotatable about the pivot 104 in a piston rod 105.

The rod 105 is connected to a piston 107, which may be reciprocated in a cylinder 106. The lever 103 is furthermore connected to the hooked end of a rod 94, which end is connected by a spring 108 to a stationary support 109. The cylinder is connected with a liquid (oil) supply conduit 110 and the space 111 below a piston 112 of a pressure reducing device 113. The ring-shaped chamber 114 is connected with the pressure conduit of the oil pump of the motor. The annular chamber 115 is connected with an exhaust line which is an actual car lead for example to the oil tank in the crank casing. The piston 112 is under the action of a spring 116, so that the oil pressure beneath the piston depends on the force exerted by the spring.

The gas pedal (not shown) of an actual car would act on the spring 116. The oil pressure therefore also depends on the position of the gas pedal. The tension of the spring 116 thus determines the oil pressure.

This coupling means has the particular property that substantially only a pure couple is exerted on the drum 74, and that the drum is not forced eccentrically, so that this drum together with the reaction race 25 in Fig. 1 may be easily moved axially.

The utility of this is clear when it is considered that if in Fig. 1 the shaft 8 is connected to an engine, the body 9 can not be adjusted in the direction of the axis I—I. Nor can the carrier 11 be displaced in this axial direction. Hence, in order to obtain the variable gear ratio which is obtained by the self adjustment of the surfaces cooperating with the balls 10, it is the reaction race 25 which must be adjustable in the axial direction.

Now this adjustability is easily possible with the drum 74, having the reaction race 25.

Figure 9A:
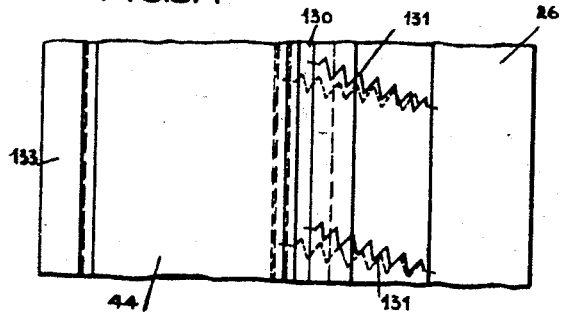
Fig. 9a is a plan view of Fig. 9.

The axial adjustment of the drum 74 occurs when the transmission is set out of the direct drive position into a low-gear position and may also be used for example to control a lever 160 which can open a valve which admits oil under pressure into a cylinder 118 so as to lift the piston 119. Thus, when direct drive is obtained by shifting the drum 25 together with the brakeband 75 to the left, in Figure 8, then upon reference to Figure 8a, it will be seen that the lever 160, which can rotate about the fixed pivot 162, and the piston 161 are so adjusted that oil under pressure from the pipe 163 can flow in the piston casing 164 and from there through aperture 165 to a pipe, which leads to the cylinder 118. This causes the brake bands 75 and 76 to be tightened on the drum 74, for, as a result, the lefthand end of the lever 101 pushes the rod 99 down on to the top surface of the rod 93. The rod 93 is also lowered. Furthermore, the link 102' is raised and the rod 94 is pushed down through the lever 103. In this respect, it must be noted that the piston 107, due to the oil pressure, is pressed against the cover of the cylinder 106, so that the pivot 104 of the lever 103 becomes a point fixed in space. Due to the lowering of the rods 93 and 94, the levers 88 and 87, which may be compared with the lever 61 in Fig. 7, are moved in such a manner that the bands are tightened. This is a different manner from that described with reference to Figs. 7, 9 and 9a for initiating the braking action.

The operation of the coupling is as follows:

If the normal driving couple for example that exerted by an internal combustion engine, as viewed from the place of the car, driver, acts in the direction of the arrow $M_k$, the torque reaction acts in the direction of the arrow $R_k$. During acceleration of the car, this torque reaction couple must be taken by the brake in order to hold the reaction member 74 against rotation.

The bands 75 and 76, due to friction, are dragged along by the reaction member 74, in other words, they are inclined to rotate in the direction of the arrow $R_k$. During this rotation, the hook 84 comes to rest on the wedge 96. Due to this fact, and to the clockwise movement of band 76, the triangle of rods P—R—Q becomes rigid. The lever arm 88 is likewise so constructed (compare lever 61 in Fig. 7), that the brake will tighten itself in an unlimited manner (self excitement of the brake). The rod 93 is pushed upwards and urges the sleeve 99 and with it the left hand end of the lever 101 upwards. Thus, the whole lever 103, the rod 94 and the lever 87 are urged downwards against the oil pressure under the piston 107. The possible rotation of the brake bands in the direction of the arrow $R_k$ is then limited by the stop 120 against which the lever 87 abuts and which may be resilient.

This action is clarified by the following explanation:

Under the influence of the torque reaction $R_k$, the parts 75 and 76 of the brake band are dragged along clockwise. In so doing, when they reach the right in Figure 8, they must be considered as tightly connected to each other, due to the formation of the fixed triangle PRR. In this connection, it is to be noted that the member 80 exerts a force on lever 88, which force exceeds that which member 81 exerts on the said lever to such an extent that the latter moves in an upward direction and in so doing, pushes the rod 93 upwardly. When a further upward movement of this rod is prevented, the lever 88, under the influence of the forces acting thereon, is subjected to counterclockwise rotation about the point V of the rod 93. This rotation causes the self-energization of the brake. By means of the links 93 and 94 and the levers 101 and 103, the brake torque is transmitted to the pivot 102 and the piston 107. Due to the oil pressure on this piston, the rod 93 exerts a downward force, and the rod 94 an upward force, on the levers 88 and 87, respectively. This action is possible, because the triangle PQR retains a fixed pattern under the influence of the forces acting on the system.

It will be clear that the forces in the rods 93 and 94 constitute a couple about the axis I and that almost no free reaction force occurs. This is due to the fact that the force in the rod 93 is transmitted to the rod 94 by the balances 101 and 103. The rate of increase of the brake couple can now be controlled by the pressure-reducing device 113 in cooperation with the gas pedal. Thus by pressing the gas pedal and hence increasing the oil pressure in the cylinder 106, the described downward movement of the piston 107 in the cylinder 106 due to the tightening of the brake can be counteracted.

The pressure in the space 111 and the cylinder 106 is only dependent on the force exerted by the spring 116, said force being adjustable by the gas pedal.

When the piston 112 is lowered, oil from the chamber 114 can pass through the ports 121 in the piston into the chamber 111 and from there to the cylinder 106. The downward movement of the piston 107 is counteracted. Also when the piston 107 rises, no vacuum is produced in the cylinder 106 and chamber 111, but oil is supplied along the path described. Upon downward movement of the piston 107 however, the piston 112 is urged upwards according to the pressure of the spring 116 and oil can be exhausted from the cylinder 106 through the port 121 and the annular chamber 115. The piston 112 moves between the annular chambers 114 and 115.

The cylinder 106, the piston 107 and the device 113 here have the function of the spring 62 in Fig. 7, and the maximum value of the couple to be transmitted is limited by this device, for if by means of pressure on the gas pedal, the piston 112 is lowered and consequently the piston 107 is urged upwards, the rod 93 exerts downward pressure on the lever 88 and through the rod 94 and the system 84, 76, 81, 88, 80, 74, 79 an equally great upward force on the lever 87.

If however, the reaction couple $R_k$ exceeds the limit defined by the oil pressure in cylinder 106, the piston 107 will move downwards, whereas the lever 88 goes up and the lever 87 goes down. When during this action the lever 87 hits the stop 120, the lever 88 no longer satisfies the conditions for self excitement of the band brake and it starts slipping, the couple exerted by the brake keeping permanently the value defined by the oil pressure in the cylinder 106.

If the couple $R_k$ is reduced to zero, the bands are completely declutched, also under the influence of the resiliency of the brake bands. If the direction of the couple $R_k$ changes, as described above in general, the hook 83 comes to rest on the wedge 95, and the triangle U—V—W becomes rigid. Then the piston 107 is drawn against the cover of the cylinder 106. The simultaneous upward movement of the piston 107 and the rigidity of triangle UVW are caused by the couple of forces in the direction of the arrow $M_k$, for due to this the rod 93 is moved downwardly and the rod 94 is moved upwardly. By consequence of these movements, the piston 107 is moved upwardly by means of the system 101, 102', 103. The rod 93 telescopes in the sleeve 99. The brake couple is now taken by the springs 97 and 108 and cannot increase further than those springs allow, because the lever 88 finally can hit on the stop 122, due to which the brake starts slipping.

The embodiment according to Fig. 10 shows another embodiment of a brake device or coupling means, e. g. for the member 26 in Fig. 1, comprising one or more ring-shaped friction elements 140. These are for instance rings of friction material, which are mounted on a disc 142 connected to the member 26 to be braked.

Adjacent to the ring 140, rings 143 and 144 are mounted having each two diametrically opposed laterally offset parts 146, 146' and 147, 147'. Notches 148 and 148' in rockable levers 149 and 149' extend between the parts 146 and 147 and 146' and 147'.

One end of each lever 149 and 149' is connected with a spring 150, 150' which at its lower end is fixed to a fixed support 151 and 151' respectively. Adjustable stops 152, 152' and the ends 146, 147, 146', 147' locate the notches 148, 148'.

If now one of the stops 153 or 154 cooperating with a notch 160 of the ring 144 is displaced so that the rings 143 and 144 may be dragged along by the friction element 140 (initiating the action of the brake), the levers 149, 149' undergo an alteration in their angular position against the action of the springs 150, 150'. The notches 148, 148' urge the parts 146, 147 and 146', 147' respectively away from each other. This means however, that the rings 143, 144 are jammed against the friction element 140, so that the latter is braked between the rings 143 and 144.

This braking action is limited by the position of one of the stops 153, 154 according to the direction of rotation of the member 26 to be braked.

Wear of the braking surface can be compensated by adjusting the stops 152, 152'.

This construction may also be used for other braking purposes, for example for braking a car wheel. In that case, the member 26 is connected with the part to be braked.

What I claim is:

1. A power transmission system of continuously variable gear ratio including the ratio 1:1, comprising a frame; a drive shaft and a driven shaft on said frame; a body on one of said shafts; contact means on the other of said shafts providing contact surfaces; a reaction member for taking the torque reaction; a plurality of solids of revolution, each of which is permanently in contact with said body, said contact means and said reaction member; said body, contact means and reaction member being adjustable relatively to each other to vary the gear ratio and means for coupling said reaction member to said frame to hold said member stationary at ratios other than 1:1; and said reaction member being mounted on said frame for rotation at the 1:1 gear ratio in the same direction and at the same angular speed as said body, said contact means and said solids of revolution.

2. A power transmission system of continuously variable gear ratio including the ratio 1:1, comprising a frame; a drive shaft and a driven shaft on said frame; a body on one of said shafts; contact means on the other of said shafts providing contact surfaces; a reaction member for taking the torque reaction; and a plurality of solids of revolutions, each of which is permanently in contact with said body, said contact means and said reaction member; said body, contact means and reaction member being adjustable relative to each other to vary the gear ratio; and said reaction member being mounted on said frame for rotation at the 1:1 gear ratio in the same direction and with the same number of revolutions as said body, said contact means and said solids of revolution; a coupling between said reaction member and said frame for transmitting the torque reaction of said reaction member to said frame; and means for declutching said coupling when the gear ratio approaches 1:1, allowing said reaction member to rotate idly.

3. In a power transmission system having a frame and a drum, a split brake band on said drum, coupling members disposed substantially diametrically opposite each other across said drum and connected to the ends of said brake band, said coupling members receiving the reaction forces from said drum through said band and being connected to said frame, said brake being substantially self-exciting, and the coupling members determining the maximum value of the reaction force which can be braked, and a system of linkage interconnecting said coupling members so that the said coupling members exert substantially equal control efforts on said brake.

4. In a power transmission system of continuously variable gear ratio, including the gear ratio 1:1 and having a frame and a rotatably mounted reaction member, a drum fast on said reaction member, a split brake band on said drum, coupling members disposed substantially diametrically opposite each other across said drum and connected to the ends of said brake band, said coupling members receiving the reaction forces from said drum through said band and being connected to said frame, said brake being substantially self exciting, and the coupling members determining the maximum value of the reaction force which can be braked, and a system of linkages interconnecting said coupling members so that the said coupling members exert substantially equal control efforts on said brake.

5. In a power transmission system having a frame and a drum, a split brake band on said drum, coupling members disposed substantially diametrically opposite each other across said drum and connected to the ends of said brake band, said coupling members receiving the brake forces from said drum through said band and being connected to said frame, said brake being substantially self exciting, and said coupling members determining the maximum value of the reaction force which can be braked, balances coupled together, and a system of linkages connecting said coupling to said balances in such manner that said coupling members will exert substantially equal control efforts on said brake in substantially the same working direction.

6. In a power transmission system of continuously variable gear ratio, including the ratio 1:1 and having a frame and a rotatably mounted reaction member, a drum fast on said reaction member, a split brake band on said drum, coupling members disposed substantially diametrically opposite each other across said drum and connected to the ends of said brake band, said coupling members receiving the brake forces from said drum through said band and being connected to said frame, said brake being substantially self-exciting, and said coupling members determining the maximum value of the reaction force which can be braked, balances coupled together, and a system of linkages connecting said coupling members to said balances in such manner that said coupling members will exert substantially equal control efforts on said brake in substantially the same working direction.

7. In a power transmission system having a frame and a drum, a split brake band on said drum, coupling members disposed substantially diametrically opposite each other across said drum and connected to the ends of said brake band, said coupling members receiving the reaction forces from said drum through said band and being connected to said frame, said brake being substantially self-exciting, and said coupling members determining the maximum value of the reaction force which can be braked, balances coupled together, and a system of linkages pivotally connecting said coupling members to said balances in such manner that the coupling members will exert substantially equal control efforts on said brake in substantially the same working direction.

8. In a power transmission system of continuously variable gear ratio, including the ratio 1:1 and having a frame and a rotatably mounted reaction member, a drum fast on said reaction member, a split brake band on said drum, coupling members disposed substantially diametrically opposite each other across said drum and connected to the ends of said brake band, said coupling members receiving the reaction forces from said drum through said bands and being connected to said frame, the brake being substantially self-exciting, and the coupling members determining the maximum value of the reaction force which can be braked, balances coupled together, and a system of linkages pivotally connecting said coupling members to said balances in such manner that the coupling members will exert substantially equal control efforts on said brake in substantially the same working direction.

9. In a power transmission system having a drum, a brake band disposed about said drum, the drum and band together forming a brake, mechanism for applying said brake, means for using the brake force of said brake transmitted through said drum to cause said mechanism to apply said brake, a stop for limiting the action of said mechanism, and means responsive automatically, on movement of said brake band due to wear, to tighten said band about said drum whereby to ensure proper functioning of said reaction-responsive means.

10. In a power transmission system of continuously variable gear ratio, including the ratio 1:1 and having a rotatably mounted reaction member, a drum fast on said reaction member, a brake band disposed about said drum, the drum and band together forming a brake, mechanism for applying said brake, means for using the brake force of said reaction member transmitted through said drum to cause said mechanism to apply said brake, a stop for limiting the action of said mechanism, and means responsive automatically on movement of said brake band due to wear, to tighten said band about said drum whereby to ensure proper functioning of said reaction-responsive means.

11. In a power transmission system having a drum, a brake band disposed about said drum, the drum and band together forming a brake, cam means connected to the ends of said band, and a cam member operatively associated with said cam means, said cam means being operable in both directions of rotation of said drum to move towards and away from each other in a self-exciting manner, to expand or tighten the brake band around the drum, and a self-clamping connection at one end of said brake band responsive automatically on movement of said brake band due to wear, to take up slack therein whereby to ensure proper functioning of said cam means and said cam member.

12. In a power transmission system of continuously variable gear ratio, including the ratio 1:1 and having a rotatably mounted reaction member, a drum fast on said reaction member, a brake band disposed about said drum, the drum and band together forming a brake, cam means connected to the ends of said band, and a cam member operatively associated with said cam means, said cam means being operable in both directions of rotation of said drum to move towards and away from each other in a self-exciting manner, to expand or tighten said brake band around said drum, and a self-clamping connection at one end of said brake band responsive automatically to movement of said brake band due to wear, to take up slack therein whereby to ensure the proper functioning of said cam means and said cam member.

13. In a power transmission having a drum and a brake band disposed about said drum, the drum and band together forming a brake, cam means at each end of said brake band, a swingable lever associated with said cam means to move the latter apart in one direction of its movement whereby to tighten said band about said drum, and to loosen said band in the other direction of the movement of said lever, two self-clamping connections on said band near one end thereof and cooperable with the corresponding cam means for taking up slack in said brake band, and a notch on said lever cooperable with said last-mentioned cam means to move said cam means and one of said connections along said brake band while the other connection holds said band to take up slack.

14. In a power transmission system of continuously variable gear ratio, including the ratio 1:1 and having a rotatably mounted reaction member, a drum fast on said reaction member, a brake band disposed about said drum, the drum and band together forming a brake, cam means at each end of said brake band, a swingable lever associated with said cam means to move the latter apart in one direction of its movement whereby to tighten said band about said drum and to release said band in the other direction of the movement of said lever, two self-clamping connections on said band near one end thereof and cooperable with the corresponding cam means for taking up slack in the brake band, and a notch on said lever cooperable with said last-mentioned cam means to move said cam means and one of said connections along said brake band while the other connection holds said band, to take up slack.

15. As part of a braking element of a power transmission system, a brake drum, a radially extending peripheral flange at one end of said drum, a brake band of appreciably less width than that of said drum operatively disposed about said drum, a second annular flange disposed about said drum on the opposite side of said band from the first flange and movable across a portion of the surface of said drum, and means acting on said second flange, causing said second flange to grip said band against the first flange when the drum is at rest, but responsive to centrifugal force upon rotation of the drum to move away from said band and to release it from the first flange.

16. In a power transmission system having a frame and an annular friction element, annular friction members disposed one on each side of said element and having laterally off-set parts, levers having notches lying between said off-set parts, and means resiliently and rockably carrying said levers on said frame so that upon movement of the friction element on movement of said reaction member, the levers are rocked and jam said annular members against said friction element to brake the latter.

17. In a power transmission system of continuously variable gear ratio, including the ratio 1:1 and having a frame and a rotatably mounted reaction member, an annular friction element fixed to said reaction member, annular friction members disposed one on each side of said element and having laterally off-set parts, levers having notches located between said off-set parts, and means resiliently and rockably carrying said levers on said frame so that upon movement of said friction element on movement of said reaction member, the levers are rocked and jam said annular members against said friction element, to brake the latter.

18. A power transmission system of continuously variable gear ratio including the ratio 1:1, comprising a frame; a drive shaft and a driven shaft on said frame; a body on one of said shafts; contact means on the other of said shafts providing contact surfaces; a reaction member for taking the torque reaction; and a plurality of solids of revolution, each of which is permanently in contact with said body, said contact means and said reaction member; said body, contact means and reaction member being adjustable relatively to each other to vary the gear ratio; and said reaction member being mounted on said frame for rotation at the 1:1 gear ratio in the same direction and at the same angular speed as said body, said contact means and said solids of revolution; a coupling between said reaction member and said frame for transmitting the torque reaction of said reaction member to said frame; and means including a servomotor for declutching said coupling when the gear ratio approaches 1:1, allowing said reaction member to rotate.

19. A continuously variable change speed epicyclic gear including the 1:1 ratio, comprising a frame, in said frame a driving shaft; a driven shaft; a reaction member; a contact part on each shaft and on the reaction member; planets in the form of bodies of revolution disposed between said shafts and permanently in contact with a surface on the contact part on the driving shaft, a surface on the contact part on the driven shaft, and a surface on the contact part on the reaction member; and means for coupling said reaction member to said frame to hold said member stationary, at ratios other than 1:1; said reaction member being so mounted that at the 1:1 gear ratio it will rotate with the two shafts; the distances between the axes of rotation and the points of contact of the planets and the surfaces being then such that rotation of the planets about their own axes causes little or no rotation of the contact parts on the driving and driven shafts with respect to each other.

20. An epicyclic gear train according to claim 19 in which the gear ratio is adjusted by relative axial movement of the reaction member and a surface on one of the shafts.

21. An epicyclic gear according to claim 19, in which the 1:1 gear ratio is obtained when the radii of the circles in which the solids roll on one of their contact surfaces approaches the zero value.

22. An epicyclic gear according to claim 19 characterized in that the 1:1 gear ratio is obtained when the parts of the transmission are in positions in which the distances from the common axes of two contact surfaces to the points of contact with each solid bear the same relationship to each other as do the distances from those points of contact to the axes of rotation of each solid.

23. An epicyclic gear according to claim 19, in which the contact surfaces on the reaction member and one of the shafts are co-axial surfaces of revolution, and the surface on the other shaft is so shaped that, together with the driving and driven contact parts, it provides wedge-shaped spaces in which the planets are retained, displacement of the planets relatively to the said other shaft consequent upon the application of driving torque causing the balls to move towards the narrower parts of these spaces.

24. An epicyclic gear according to claim 19, in which the contact surfaces on the reaction member and one of the shafts are co-axial surfaces of revolution, and the surface on the other shaft is so shaped that, together with the driving and driven contact parts, it provides wedge-shaped spaces in which the planets are retained, adjacent spaces having their apices extending in opposite directions, displacement of the planets relatively to the said other shaft consequent upon the application of torque in either direction of rotation causing the balls to move towards the narrower parts of one or the other set of said spaces.

25. An epicyclic gear according to claim 19 in which the coupling means take the form of a brake for controlling the reaction member and which allows free rotation in one direction, but applies a braking torque to rotation in the other direction.

26. An epicyclic gear according to claim 19, in which the coupling means take the form of a brake for controlling the reaction member and which allows free rotation in one direction, but applies a braking torque to rotation in the other direction, and means forming part of said brake whereby the direction of free rotation and of braked rotation of the reaction member are interchangeable.

27. A power transmission system of continuously variable gear ratio including the ratio 1:1, comprising a frame; a drive shaft and a driven shaft on said frame; a body on one of said shafts; contact means on the other of said shafts providing contact surfaces; a reaction member for taking the torque reaction; a plurality of solids of revolution, each of which is permanently in contact with said body, said contact means and said reaction member; said body, contact means and reaction member being adjustable relative to each other to vary the gear ratio, and said reaction member being mounted on said frame for rotation at the 1:1 gear ratio in the same direction and with the same number of revolutions as said body, said contact means and said solids of revolution; a coupling between said reaction member and said frame for transmitting the torque reaction of said reaction member to said frame; means for de-clutching said coupling when the gear ratio approaches 1:1, allowing said reaction member to rotate idly, and means for causing said coupling to slip when the reaction load exceeds a predetermined maximum, to permit some rotation of the reaction member.

28. A power transmission system of continuously variable gear ratio including the ratio 1:1, comprising a frame; a drive shaft; a driven shaft; a reaction member; contact parts on each shaft and on the reaction member; planets in the form of bodies of revolution disposed between said shafts and permanently in contact with surfaces on the contact part of the driving shaft, on the contact part of the driven shaft, and on the contact part of the reaction member; said reaction member being so mounted that at the 1:1 gear ratio it will rotate with the two shafts; a coupling between said reaction member and the frame for transmitting the torque reaction of said reaction member to said frame; and means for declutching said coupling when the gear ratio approaches 1:1, allowing said reaction member to rotate.

29. An epicyclic gear train according to claim 28, in which at the 1:1 gear ratio the distances between the axes of rotation and the points of contact of the planets and the surfaces are such that rotation of the planets about their own axes causes little or no rotation of the driving and driven shafts with respect to each other.

30. An epicyclic gear train according to claim 28, in which the gear ratio is adjusted by relative axial movement of the contact parts on the reaction member and on one of the two shafts.

31. An epicyclic gear train according to claim 28, in which the 1:1 gear ratio is obtained when the radii of the circles in which the solids roll on one of their contact surfaces approaches the zero value.

32. An epicyclic gear train according to claim 28, characterized in that the 1:1 gear ratio is obtained when the parts of the transmission are in positions in which the distances from the common axes of two contact surfaces to the points of contact with each solid bear the same relationship to each other as do the distances from those points of contact to the axes of rotation of each solid.

33. An epicyclic gear train according to claim 28, in which the contact surfaces on the reaction member and one of the shafts are co-axial surfaces of revolution, and the surface on the other shaft is so shaped that, together with the driving and driven contact parts, it provides wedge-shaped spaces in which the planets are retained, displacement of the planets relatively to the said other shaft consequent upon the application of driving torque causing the balls to move towards the narrower parts of these spaces.

34. An epicyclic gear train according to claim 28, in which the contact surfaces on the reaction member and one of the shafts are co-axial surfaces of revolution, and the surface on the other shaft is so shaped that, together with the driving and driven contact parts, it provides wedge-shaped spaces in which the planets are retained, adjacent spaces having their apices extending in opposite directions, displacement of the planets relatively to the said other shaft consequent upon the application of driving torque causing the balls to move towards the narrower parts of these spaces.

35. An epicyclic gear train according to claim 28, in which the means for declutching the coupling function automatically when the gear ratio approaches 1:1 to declutch the coupling.

36. An epicyclic gear train according to claim 28, in which the coupling allows free or almost free rotation of the reaction member in one direction but applies a braking torque to rotation in the other direction.

37. An epicyclic gear train according to claim 28, in which the coupling allows free or almost free rotation in one direction, but applies a braking torque to rotation in the other direction, whereby the direction of free rotation and of braked rotation of the reaction member are interchangeable.

38. The combination of a planetary gearing including planet gears, of continuously variable gear ratio including a reaction member rotatably mounted in a frame, against which reaction member said planet gears normally react with variable force dependent upon the instantaneous torque being transmitted, and an adjustable coupling between said reaction member and said frame, the said coupling comprising means for transmitting the torque reaction on said reaction member, up to a fixed predetermined maximum value, from said reaction member to said frame, and members acting upon said first means upon occurrence of and in response to reaction forces in excess of said predetermined maximum to cause said coupling to slip such forces which otherwise would be transmitted from said reaction means to said frame, whereby said planetary gearing can be loaded up only to said predetermined maximum value of torque.

39. The combination of a planetary gearing including planet gears, of continuously variable gear ratio including a reaction member rotatably mounted in a frame, against which reaction member said planet gears normally react with variable force, dependent upon the instantaneous torque being transmitted, and a self-adjusting coupling between said reaction member and said frame, said coupling comprising means for transmitting the torque reaction on said reaction member, up to a fixed predetermined maximum value, from said reaction member to said frame, means acting upon said first means upon occurrence of and in response to reaction forces in excess of said predetermined maximum to cause said coupling to slip forces in excess of said predetermined maximum value, whereby said planetary gearing can be loaded up only to said predetermined maximum value of torque and means for regulating and fixing said predetermined maximum value of transmitted torque.

40. The combination of a planetary gearing including planet gears, having continuously variable gear ratio including the one to one ratio, a reaction member rotatably mounted in a frame, against which reaction member said planet gears normally react with variable force, dependent upon the instantaneous torque being transmitted, and a self-adjusting coupling disposed between said reaction member and said frame, said coupling comprising means for directing the torque reaction on said reaction member, up to a fixed predetermined maximum value, from said reaction member to said frame, means acting upon said first means upon occurrence of and in response to reaction forces in excess of said predetermined maximum to cause said coupling to slip any reaction force in excess of said predetermined maximum, whereby said planetary gearing can be loaded up only to said predetermined maximum value of torque, and means for declutching said coupling when the gear ratio approaches the one to one value, leaving the reaction member free to rotate idly.

41. The combination of a planetary gearing including planet gears, including a reaction member, against which reaction member said planet gears normally react with variable force, dependent upon the instantaneous torque being transmitted, a self-energizing brake or coupling for said reaction member, capable of slipping any force couple on said reaction member, in excess of a fixed predetermined maximum value for which the brake is designed, and a stop so positioned relative to said brake that upon the occurrence of a force couple exerted on said reaction member equal to or in excess of said maximum value, the brake contacts the said stop and slips any excess force couple, whereby said planetary gearing can be loaded up only to said predetermined maximum value of torque.

42. The combination of a planetary gear transmission system including planet gears, for a prime mover having a throttle and including a reaction element against which reaction member said planet gears normally react with variable force, dependent upon the instantaneous torque being transmitted, a self-energizing brake or coupling for transmitting the reaction force exerted on the said reaction element by said planet gears, and capable of slipping any force couple exerted on said reaction element in excess of a maximum value predetermined in accordance with the particular throttle setting; and a throttle controlled stop so positioned relative to said brake that upon the occurrence of a force couple equal to or in excess of the said momentary maximum value, the brake contacts the said stop and slips any excess force couple, whereby said planetary gearing can be loaded up only to said predetermined maximum of torque.

43. The combination of a planetary gear transmission system including planet gears, for a prime mover having a throttle, and including a reaction element against which reaction member said planet gears normally react with variable force, dependent upon the instantaneous torque being transmitted, a self-energizing brake or coupling capable of slipping any force couple exerted on said reaction element in excess of a maximum value predetermined in accordance with the particular throttle setting; a throttle-controlled stop so positioned relative to said brake that upon the occurrence of a force couple on said reaction element equal to or in excess of said momentary maximum value, the brake contacts the said stop and slips any excess force couple; and auxiliary, manually-operable means for bringing at will said brake and stop into operable co-action so as to slip force couples of less than said maximum value.

44. The combination of a planetary gearing, including planet gears, of continuously variable gear ratio including the one to one ratio, and including a reaction member arranged for rotation at that ratio, against which reaction member said planet gears normally react with variable force, dependent upon the instantaneous torque being transmitted, and a brake for said reaction member, comprising a drum fast on said reaction member and a brake band disposed about said drum, mechanism for applying said brake, responsive to the reaction force exerted on said reaction member by said planet gears, transmitted through said drum, and a stop positioned with respect to said mechanism so that the latter comes into contact therewith upon occurrence of and in response to reaction forces exerted on said reaction member, in excess of a predetermined maximum, so that the drum slips any excess reaction forces, whereby said planetary gearing can be loaded up only to said predetermined maximum value of torque.

45. The combination of a planetary gearing including planet gears, having continuously variable gear ratio including the one to one ratio and having a reaction member rotatably mounted in a frame, against which reaction member said planet gears normally react with variable force, dependent upon the instantaneous torque being transmitted, and a self-adjusting coupling disposed between said reaction member and said frame for transmitting to said frame the torque reaction on said reaction member, up to a fixed predetermined maximum value, from said reaction member, and comprising means operable in response to the occurrence of reaction forces on said reaction member in excess of said predetermined maximum for slipping the same, whereby said planetary gears can be loaded up only to said predetermined maximum value of torque, and means for declutching said brake or coupling in response to reversal of the direction of the reaction torque.

46. The combination of a planetary gearing having planet gears and including a reaction member, against which reaction member said planet gears normally react with variable force, dependent upon the instantaneous torque being transmitted, and brake means for braking said reaction element, said brake means comprising a drum on said reaction element, a brake band disposed about said drum, mechanism attached to and responsive to the reaction force of said brake for applying said brake, and a stop so positioned that the brake-applying mechanism comes into contact therewith upon the occurrence of and in response to the maximum reaction loads for which the brake is designed, the brake-applying mechanism thereby slipping as a result of its contact with said stop, reaction loads in excess of said maximum, whereby said planetary gearing can be loaded up only to said predetermined maximum value of torque.

47. The combination of a planetary gearing having planet gears and including a reaction member, against which reaction member said planet gears normally react with variable force, dependent upon the instantaneous torque being transmitted, and brake means for braking said reaction element, said brake means comprising a drum on said reaction element, a brake band disposed about said drum, mechanism attached to and employing the reaction force transmitted by said band through said drum for applying said brake about said drum, a lever forming part of said mechanism and movable with said brake band, and a stop so positioned that said lever is moved upon application of said brake to a fixed predetermined maximum value, and as an incident of said application, into contact therewith, said stop thereby blocking further movement of said mechanism in a brake-setting direction, whereby said planetary gears can be loaded up only to said predetermined maximum value of torque.

48. The combination of a planetary gearing having planet gears and including a reaction member, against which reaction member said planet gears normally react with variable force, dependent upon the instantaneous torque being transmitted, and brake means for braking said reaction element, said brake means comprising a drum on said reaction element, a brake band disposed about said drum, mechanism attached to and employing the reaction force transmitted by said brake band through said drum for applying said brake about said drum, a lever forming part of said mechanism, and movable with said brake band, and a stop positioned so that said lever is moved upon application of said brake to a fixed predetermined maximum value, as an incident of said application, into contact therewith, said stop thereby blocking further movement of said mechanism in a brake-setting direction, whereby said planetary gears can be loaded up only to said predetermined maximum value of torque, and pedal-controlled means for adjusting the position of said stop, to adapt the brake for various maximum reaction forces.

CORNELIS ANDRIES HEERO MULDER.